(12) United States Patent
Yoneda et al.

(10) Patent No.: US 9,749,566 B2
(45) Date of Patent: Aug. 29, 2017

(54) IMAGING DEVICE AND ELECTRONIC DEVICE

(71) Applicants: Kazuhiro Yoneda, Osaka (JP); Hirofumi Watanabe, Hyogo (JP); Takaaki Negoro, Osaka (JP); Katsuhiko Aisu, Hyogo (JP); Yasukazu Nakatani, Hyogo (JP); Katsuyuki Sakurano, Hyogo (JP)

(72) Inventors: Kazuhiro Yoneda, Osaka (JP); Hirofumi Watanabe, Hyogo (JP); Takaaki Negoro, Osaka (JP); Katsuhiko Aisu, Hyogo (JP); Yasukazu Nakatani, Hyogo (JP); Katsuyuki Sakurano, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/641,683

(22) Filed: Mar. 9, 2015

(65) Prior Publication Data

US 2015/0264280 A1    Sep. 17, 2015

(30) Foreign Application Priority Data

Mar. 12, 2014    (JP) .................................. 2014-048853

(51) Int. Cl.
*H04N 5/374* (2011.01)
*H04N 5/355* (2011.01)

(52) U.S. Cl.
CPC ......... *H04N 5/374* (2013.01); *H04N 5/35527* (2013.01)

(58) Field of Classification Search
CPC ...... H04N 5/3559; H04N 5/374; H04N 5/378; H04N 5/37457; H04N 5/35527; H01L 27/14681; H01L 27/1443; H01L 27/144
See application file for complete search history.

(56) References Cited

U.S. PATENT DOCUMENTS

| | | | | |
|---|---|---|---|---|
| 3,463,928 | A * | 8/1969 | Murphy | .................... H03F 3/08 250/214 R |
| 5,105,264 | A * | 4/1992 | Erhardt | ................ H04N 5/3537 257/234 |
| 5,227,793 | A | 7/1993 | Aisu | |
| 5,276,407 | A * | 1/1994 | Mead | ................ H01L 27/14681 257/E27.149 |
| 5,289,023 | A * | 2/1994 | Mead | ................ H01L 27/14681 257/291 |

(Continued)

FOREIGN PATENT DOCUMENTS

JP    2013-187527    9/2013

*Primary Examiner* — Luong T Nguyen
(74) *Attorney, Agent, or Firm* — Cooper & Dunham LLP

(57) ABSTRACT

An imaging device includes a photoelectric conversion element which photoelectrically converts incident light and generates a charge, accumulates and amplifies the charge, and outputs a photocurrent, wherein a level of an output signal when a charge which is accumulated in the photoelectric conversion element is outputted over a saturated amount of accumulable charge includes a level of an output signal of a charge of a photocurrent of DC component which is generated in the photoelectric conversion element and outputted during a readout time when the charge which is accumulated in the photoelectric conversion element is outputted.

15 Claims, 4 Drawing Sheets

(56) References Cited

U.S. PATENT DOCUMENTS

| | | | |
|---|---|---|---|
| 5,489,772 A * | 2/1996 | Webb | H04N 5/335 |
| | | | 250/208.1 |
| 5,656,841 A | 8/1997 | Watanabe et al. | |
| 5,825,673 A | 10/1998 | Watanabe | |
| 6,075,404 A | 6/2000 | Shindoh et al. | |
| 6,115,065 A * | 9/2000 | Yadid-Pecht | H04N 5/235 |
| | | | 348/308 |
| 6,271,730 B1 | 8/2001 | Abe et al. | |
| 6,278,322 B1 | 8/2001 | Aisu et al. | |
| 2001/0020844 A1 | 9/2001 | Andoh et al. | |
| 2002/0117682 A1 * | 8/2002 | Vande Voorde | H01L 27/14681 |
| | | | 257/149 |
| 2002/0175664 A1 | 11/2002 | Andoh et al. | |
| 2003/0001206 A1 | 1/2003 | Negoro et al. | |
| 2003/0197552 A1 | 10/2003 | Watanabe | |
| 2003/0205993 A1 | 11/2003 | Andoh et al. | |
| 2003/0214336 A1 | 11/2003 | Watanabe | |
| 2004/0004992 A1 | 1/2004 | Aota et al. | |
| 2004/0175007 A1 | 9/2004 | Aisu | |
| 2004/0183119 A1 | 9/2004 | Negoro et al. | |
| 2004/0227183 A1 | 11/2004 | Negoro et al. | |
| 2004/0251399 A1 * | 12/2004 | Misek | G01J 1/44 |
| | | | 250/214 R |
| 2005/0002429 A1 | 1/2005 | Nakatani | |
| 2005/0017297 A1 | 1/2005 | Shimizu et al. | |
| 2005/0141395 A1 | 6/2005 | Nakatani | |
| 2005/0194639 A1 | 9/2005 | Negoro et al. | |
| 2005/0199951 A1 | 9/2005 | Shimizu et al. | |
| 2005/0218478 A1 | 10/2005 | Watanabe | |
| 2005/0218968 A1 | 10/2005 | Watanabe | |
| 2005/0270011 A1 | 12/2005 | Aota et al. | |
| 2006/0027864 A1 | 2/2006 | Negoro et al. | |
| 2006/0065949 A1 | 3/2006 | Kato et al. | |
| 2006/0138546 A1 | 6/2006 | Negoro et al. | |
| 2006/0152284 A1 | 7/2006 | Morino | |
| 2006/0197581 A1 | 9/2006 | Chun et al. | |
| 2006/0226888 A1 | 10/2006 | Watanabe | |
| 2007/0023517 A1 | 2/2007 | Tan et al. | |
| 2007/0047332 A1 | 3/2007 | Aota et al. | |
| 2007/0102638 A1 | 5/2007 | Watanabe | |
| 2007/0109039 A1 | 5/2007 | Watanabe | |
| 2007/0111557 A1 | 5/2007 | Higashiguchi et al. | |
| 2007/0188216 A1 | 8/2007 | Negoro | |
| 2008/0012543 A1 | 1/2008 | Negoro | |
| 2008/0100276 A1 | 5/2008 | Negoro | |
| 2008/0122035 A1 | 5/2008 | Watanabe | |
| 2008/0149843 A1 * | 6/2008 | Tredwell | H04N 3/155 |
| | | | 250/370.11 |
| 2008/0205672 A1 | 8/2008 | Aisu | |
| 2008/0218147 A1 | 9/2008 | Negoro et al. | |
| 2008/0303588 A1 | 12/2008 | Aota et al. | |
| 2009/0033420 A1 | 2/2009 | Negoro | |
| 2009/0064791 A1 | 3/2009 | Ueda et al. | |
| 2010/0039547 A1 * | 2/2010 | Kinugasa | G01J 1/18 |
| | | | 348/308 |
| 2010/0193887 A1 | 8/2010 | Ueda et al. | |
| 2011/0012582 A1 | 1/2011 | Aisu | |
| 2011/0042745 A1 | 2/2011 | Negoro | |
| 2011/0155913 A1 | 6/2011 | Noguchi et al. | |
| 2011/0169570 A1 | 7/2011 | Aota et al. | |
| 2011/0181358 A1 | 7/2011 | Aisu | |
| 2011/0185326 A1 | 7/2011 | Ueda et al. | |
| 2011/0205416 A1 * | 8/2011 | Nishihara | H01L 27/14609 |
| | | | 348/300 |
| 2011/0260038 A1 * | 10/2011 | Hirotsu | H04N 5/3745 |
| | | | 250/208.1 |
| 2012/0013383 A1 | 1/2012 | Negoro et al. | |
| 2012/0032733 A1 | 2/2012 | Negoro | |
| 2012/0181430 A1 | 7/2012 | Noguchi et al. | |
| 2013/0127504 A1 | 5/2013 | Hayashi et al. | |
| 2013/0187030 A1 | 7/2013 | Hayashi et al. | |
| 2013/0234277 A1 | 9/2013 | Negoro et al. | |
| 2013/0240716 A1 | 9/2013 | Hayashi et al. | |
| 2013/0284931 A1 | 10/2013 | Nagahisa et al. | |
| 2014/0239158 A1 | 8/2014 | Hayashi et al. | |
| 2014/0367550 A1 | 12/2014 | Aisu et al. | |

* cited by examiner

IMAGING DEVICE AND ELECTRONIC DEVICE

CROSS-REFERENCE TO RELATED APPLICATIONS

The present application is based on and claims priority from Japanese Patent Application Number 2014-048853, filed Mar. 12, 2014, the disclosure of which is hereby incorporated by reference herein in its entirety.

BACKGROUND

The present application relates to an imaging device including a photoelectric conversion element which photoelectrically converts incident light, and generates and amplifies a signal charge, and relates to an electronic device using the imaging device.

As a solid-state imaging device with high sensitivity, there is an imaging device in which a phototransistor is included as a photoelectric conversion element. Since larger output is obtained with respect to light by an amplifying function which the phototransistor has than by a photodiode, it is possible to achieve higher sensitivity compared to a CCD (Charge-Coupled Device) image sensor or a CMOS (Complementary Metal-Oxide Semiconductor) image sensor using the photodiode as the photoelectric conversion element. On the other hand, regarding an optical input range (dynamic range), in an accumulation drive type which is the main stream at present, it is already known that an upper limit is determined by a saturated amount of accumulable charge in junction capacitance as well as other sensors.

For example, in Japanese Patent Application Publication No. 2013-187527, for the purpose of expanding a dynamic range, a solid-state imaging device in which a phototransistor is included as a photoelectric conversion element is disclosed. This invention discloses a method of expanding a dynamic range in which an implanted electrode which is insulated by an oxide film exists between elements, and an amplification factor is varied by applying a voltage to the electrode and a photocurrent is changed.

SUMMARY

However, since a conventional photoelectric conversion element using a phototransistor needs to form an emitter, a base, and a collector to make a difference in impurity concentration on a silicon substrate, impurity concentration in a base region is small compared to a photodiode. As the impurity concentration becomes smaller, the width of a depletion layer becomes larger, and parasitic capacitance (junction capacitance) becomes smaller, and therefore, in a solid-state image sensor using a phototransistor, an amount of accumulable charge becomes approximately one digit smaller compared to that in a solid-state image sensor using a photodiode, and there is a problem in that a dynamic range also becomes smaller accordingly.

Additionally, in Japanese Patent Application Publication No. 2013-187527, although an invention for expanding the dynamic range is disclosed, it is not possible to expand the dynamic range because parasitic capacitance of a photoelectric conversion element is obstructed.

An objective of the present invention is to provide an imaging device which solves the above problem and expands the dynamic range compared to that in a conventional technique.

In order to achieve the above objective, an embodiment of the present invention provides: an imaging device comprising a photoelectric conversion element which photoelectrically converts incident light and generates a charge, accumulates and amplifies the charge, and outputs a photocurrent, wherein a level of an output signal when a charge which is accumulated in the photoelectric conversion element is outputted over a saturated amount of accumulable charge includes a level of an output signal of a charge of a photocurrent of DC component which is generated in the photoelectric conversion element and outputted during a readout time when the charge which is accumulated in the photoelectric conversion element is outputted.

DETAILED DESCRIPTION OF THE PREFERRED EMBODIMENTS

Figure 1:
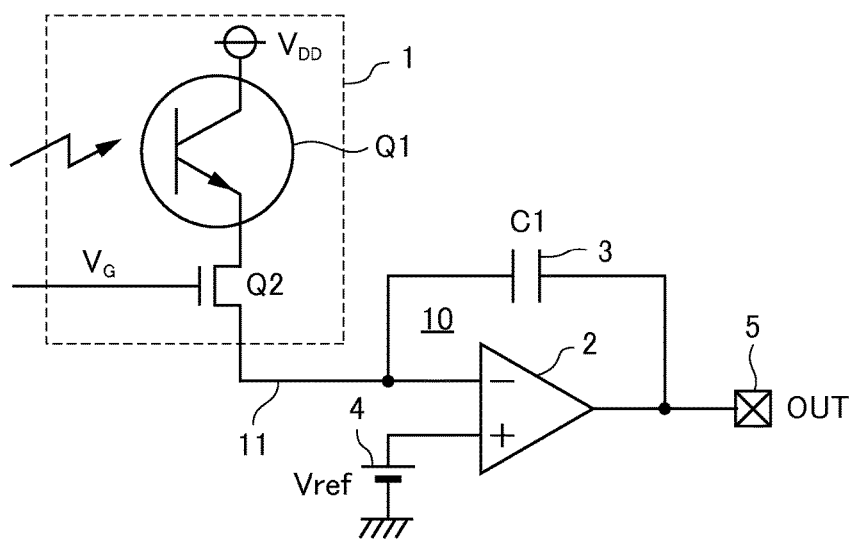
FIG. 1 is a circuit diagram which shows a configuration example of a signal-processing circuit for a solid-state imaging device having a phototransistor Q1 as a photoelectric conversion element according to an embodiment of the present invention.

Hereinafter, with reference to the drawings, an embodiment of the present invention will be explained. Please note that in the following embodiment, the same reference signs denote similar constituent elements.

A solid-state imaging device according to the present embodiment uses not only a charge which is accumulated (accumulated charge) in parasitic capacitance during exposure but also a photocurrent which is generated during a signal readout time (readout time) as a signal, in a signal-processing circuit of a solid-state image sensor using a phototransistor as a photoelectric conversion element. Accordingly, it is characterized in that it is also allowed to have sensitivity even with respect to light exceeding a saturated exposure amount. That is, by integrating not only the charge which is accumulated in the parasitic capacitance but also the photocurrent which is generated during the readout time, and processing them as a signal, the dynamic range which has not been expanded because a saturated amount of charge has been obstructed is expanded compared to that in a conventional technique. Hereinafter, the present embodiment will be explained in detail.

Basically, in a solid-state imaging device using a photodiode as a so-called image sensor, output with respect to light is low, and therefore, sensitivity has been enhanced by a method of multiplying a gain by an accumulation time such that a charge which is generated by a photoelectric effect during exposure is accumulated in parasitic capacitance in the photodiode, and the charge is read out. More precisely, a charge which is generated during the accumulation time, and a charge which is generated during a transfer time when the accumulated charge is transferred to floating diffusion (FD) become output. Therefore, an amount of signal is equivalent to an amount of charge which is generated during the (accumulation time+transfer time); however, a transfer time in a solid-state imaging device is negligible, and is hardly taken into account before an accumulation time in millisecond order. As a result, an upper limit of charges accumulated in the parasitic capacitance=a limit of output, and therefore, an upper limit of the dynamic range is determined.

On the other hand, in a phototransistor, a gain is obtained to the amount multiplied by a DC amplification factor $h_{FE}$ (for example, 50 times to 100 times) by an amplifying function of the phototransistor, and therefore, the accumulation time can be shortened by only the above amount compared to the solid-state imaging device using the photodiode, and a ratio of an amount of charge which is generated during the readout time to an amount of signal becomes large. In addition, a photocurrent which is generated during the readout time is amplified by DC amplification factor $h_{FE}$ times compared to a photocurrent of the photodiode, which has a level which can be sufficiently detected as a signal. Therefore, in the present embodiment, it is possible to process a charge of the photocurrent which is generated during the readout time also as a signal, and it is possible to expand the dynamic range by being allowed to have sensitivity with respect to light exceeding a saturated amount of charge which is accumulable in the parasitic capacitance.

FIG. 1 is a circuit diagram which shows a configuration example of a signal-processing circuit for a solid-state imaging device having a phototransistor Q1 as a photoelectric conversion element according to an embodiment of the present invention.

In FIG. 1, reference sign 1 denotes a pixel, and in accordance with resolution, a plurality of pixels 1 are supposed to be arranged in an array manner (see FIG. 8); however, in FIG. 1, only one pixel 1 is shown for simplification. Additionally, as to the pixel 1, for the purpose of explaining a basic operation, a simple configuration of the pixel 1 is shown in which only a phototransistor Q1 and a selection switch MOS transistor Q2 (hereinafter, referred to as selection switch transistor) are included, and an on/off control of the selection switch transistor Q2 is performed by selectively switching a gate voltage $V_G$.

In FIG. 1, a voltage source of a power supply voltage VDD is connected to a signal line 11 via the phototransistor Q1 and the selection switch transistor Q2, and the signal line 11 is connected to an inverting input terminal of an operational amplifier (op-amp) 2 of an integrating circuit 10. A reference voltage Vref from a reference voltage source 4 is applied to a non-inverting input terminal of the operational amplifier 2, and an output terminal of the operational amplifier 2 is connected to the inverting input terminal via an integrating capacitor 3 of capacitance C1 and to an output terminal 5.

Firstly, a basic operation of an accumulation type will be explained. During exposure, a low-level voltage is applied to a gate of the selection switch transistor Q2, the selection switch transistor Q2 is turned off, the phototransistor Q1 is irradiated with light, and a charge is generated. The charge is accumulated and amplified in parasitic capacitance of the phototransistor Q1 without being outputted from a pixel 1. Next, at the time when an output timing of the pixel 1 comes, a high-level voltage is applied to the gate of the selection switch transistor Q2, and the selection switch transistor Q2 is turned on. During a readout time, the accumulated charge and a charge which is being generated at this time are outputted, and when the readout time ends, the low-level voltage is applied to the gate again, and the selection switch transistor Q2 is turned off. The charges which are outputted from the pixel 1 during the readout time are accumulated in the integrating capacitor 3 of the integrating circuit 10, converted to a voltage, and then outputted from the output terminal 5 as an output signal of the pixel 1.

Figure 2:
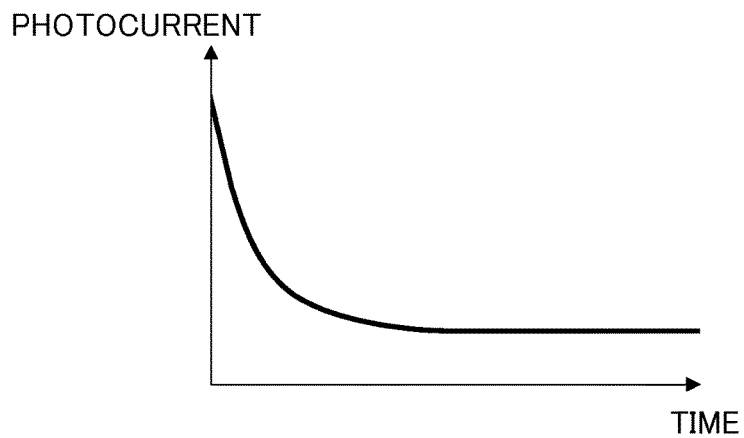
FIG. 2 is a graph which shows a change over time of a photocurrent which is outputted from a pixel 1 in FIG. 1.

FIG. 2 is a graph which shows a change over time of a photocurrent outputted from the pixel 1 in FIG. 1. Immediately after radiation of light starts, a charge which is accumulated (accumulated charge) in parasitic capacitance of the phototransistor Q1 is outputted, and a large photocurrent flows; however, it reduces over time, and is finally concluded to be a photocurrent in accordance with illuminance at the time. The readout time is set to be equal to or more than a time in which all the accumulated charges are outputted.

Figure 3:
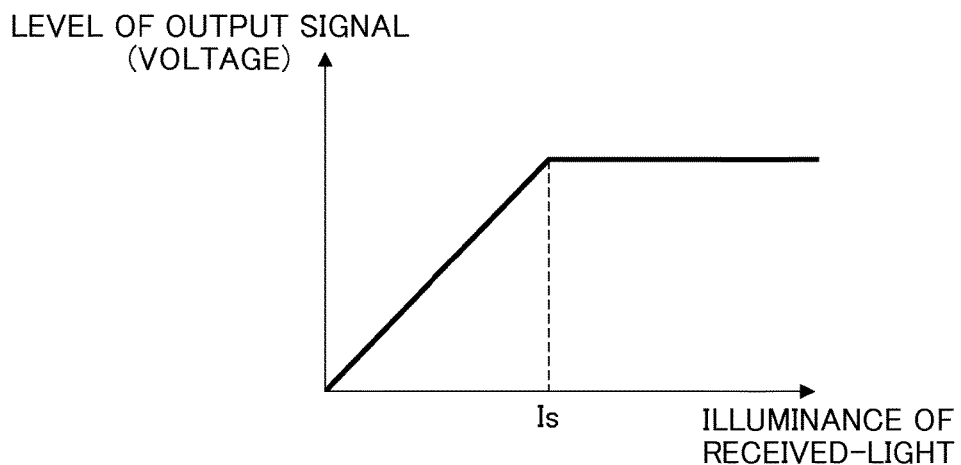
FIG. 3 is a graph which shows a relationship between illuminance of received-light and a level of an output signal (voltage) when considering only an accumulated charge, in FIG. 2.

FIG. 3 is a graph which shows a relationship between illuminance of received-light and a level of an output signal (voltage) when considering only the accumulated charge, in FIG. 2. In FIG. 3, a charge which is generated during exposure has a linear relationship with intensity of light (≈exposure amount=illuminance of received-light), and therefore, the level of the output signal (voltage) also increases with a constant inclination. However, when illuminance of received-light exceeds a threshold value Is, a charge which is accumulable in the parasitic capacitance of the phototransistor Q1 reaches a saturation level, and therefore, even if light is more intense than that, the level of the output signal (voltage) does not change, and is concluded to be at a constant value. Please note that the threshold value Is is different depending on an accumulation time.

Figure 4:
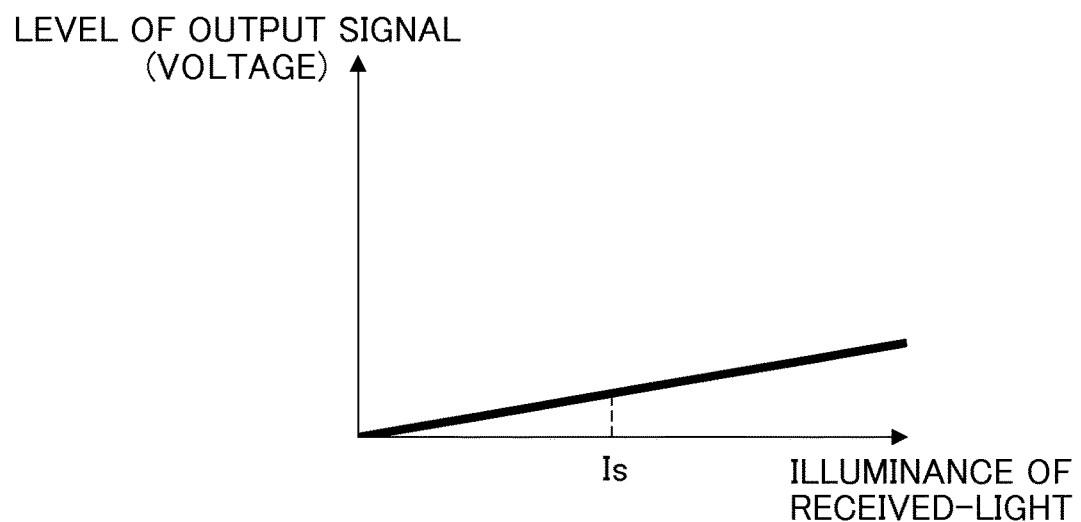
FIG. 4 is a graph which shows a relationship between illuminance of received-light and a level of an output signal (voltage) when considering only a photocurrent of DC (Direct-Current) component without taking account of an accumulated charge, in FIG. 2.

FIG. 4 is a graph which shows a relationship between illuminance of received-light and a level of an output signal (voltage) when considering only a photocurrent (photocurrent after being concluded to be at the constant value in FIG. 2, and hereinafter, referred to as "photocurrent of DC (Direct-Current) component") which is steadily generated during the readout time, in FIG. 2. The level of the output signal (voltage) has a linear relationship with intensity of light, and therefore, a charge which is outputted during the readout time also increases with a constant inclination. Additionally, in FIG. 4, since the charge which is accumulated in the parasitic capacitance is not considered, the level of the output signal (voltage) increases even with respect to light in which illuminance of received-light is equal to or more than the threshold value Is; however, from an ordinarily-established relationship in which the accumulation time>>the readout time, an inclination of the graph is more gentle than that in FIG. 3.

Figure 5:
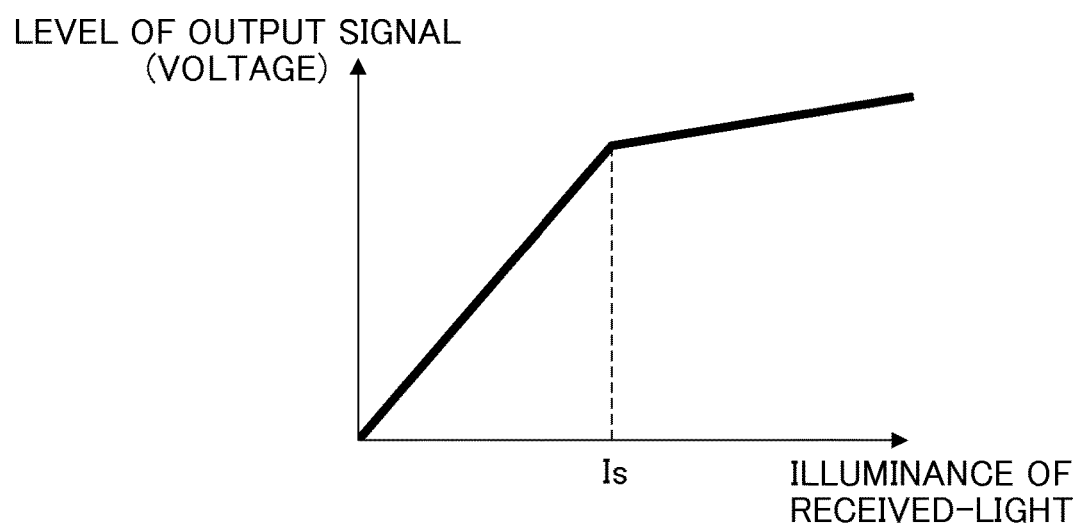
FIG. 5 is a graph which shows a relationship between illuminance of received-light and a level of an output signal (voltage) when considering an actual accumulated charge and a photocurrent of DC component together, in the pixel 1 of FIG. 1.

FIG. 5 is a graph which shows a relationship between illuminance of received-light and a level of an output signal (voltage) when considering actual accumulated charge and photocurrent of DC component together, in the pixel 1 of FIG. 1. As shown in FIG. 5, when illuminance of received-light is less than or equal to the threshold value $I_S$, a sum of the accumulated charge and a charge of the photocurrent of DC component appear as a level of an output signal (voltage), and therefore, the level of the output signal (voltage) shows a characteristic which is linear with respect to the illuminance of received-light, and has a sharper inclination than that in FIG. 3. When the illuminance of received-light exceeds the threshold value Is, the accumulated charge is concluded to be at a constant value, and therefore, only an increase of the charge of the photocurrent of DC component is reflected in output. Accordingly, the level of the output signal (voltage) is linear with respect to the illuminance of received-light, and the inclination is equal to that in FIG. 4, and a characteristic is shown which is more gentle than a case where the illuminance of received-light is less than or equal to the threshold value $I_S$. Please note that in FIG. 1, in the signal line 11, a coupling capacitor is not included, and therefore, the level of the output signal (voltage) of the charge of the photocurrent of DC component also can be taken in the integrating circuit 10.

Accordingly, by setting a ratio of an exposure time to the readout time so as to obtain the output characteristic in FIG. 5, it is possible to use a sensor having a wide dynamic range which is capable of responding to even a high-illuminance region exceeding the upper limit which is determined by the saturated amount of charge. Additionally, in the present embodiment, from the threshold value Is as a border, sensitivity changes and resolution in the high-illuminance region reduces, and therefore, it is possible to obtain an image which is suitable for a short range to an intermediate range in which there is a lot of important information in a scene of moving from a dark part toward a bright part (for example, a case of running in a tunnel toward an exit, or the like).

Additionally, this operation is achieved by shortening the accumulation time by the amplifying function of the phototransistor Q1. At this time when trying to achieve the same in the solid-state imaging device having the photodiode, since an absolute value of a photocurrent is as small as $1/h_{FE}$, and a considerably long readout time is needed, it is difficult to achieve in a state where a frame rate of a general imaging device is ensured.

Figure 6:
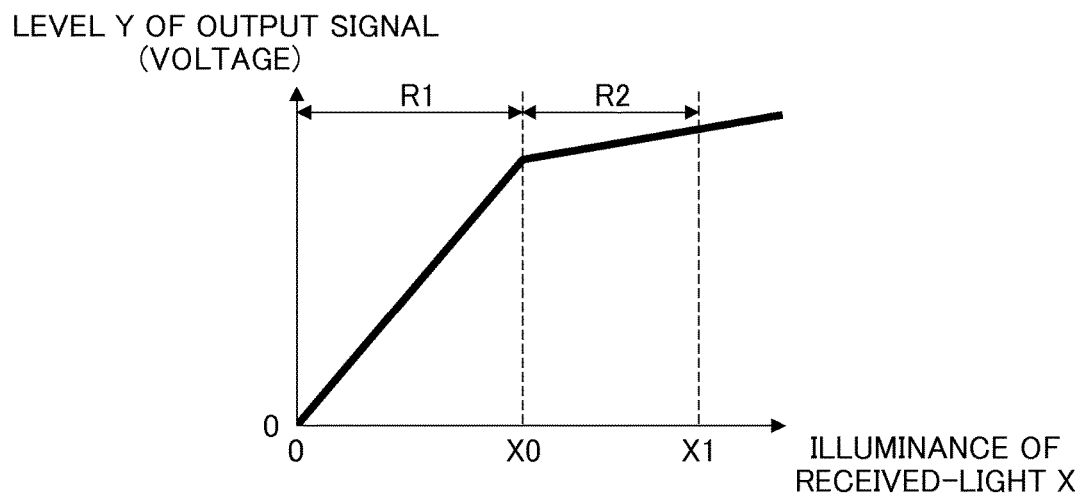
FIG. 6 is a graph of a relational model showing a relationship between illuminance of received-light X and a level Y of an output signal (voltage) for explaining a method of setting an accumulation time and a readout time, in the solid-state imaging device in FIG. 1.

FIG. 6 is a graph of a relational model showing a relationship between illuminance of received-light X and a level Y of an output signal (voltage) for explaining a method of setting the accumulation time and the readout time, in the solid-state imaging device in FIG. 1. Here, with reference to FIG. 6, setting of the accumulation time and the readout time will be considered specifically.

For easy understanding, in FIG. 6, the illuminance of received-light is shown on an X-axis, and the level of the output signal (voltage) is shown on a Y-axis, and assuming that an image sensor which obtains output which is linear with respect to the illuminance of received-light is shown. By use of the following two ranges R1, R2 of illuminance of received-light, the level Y of the output signal (voltage) is expressed by each of the following expressions.

(R1) the level Y of the output signal (voltage) from 0-1× illuminance of received-light to illuminance of received-light X0 at which illuminance reaches a saturated exposure amount is expressed by the following expression (1).

$$Y=(t1+t2)\cdot A\cdot X \tag{1}$$

(R2) the level Y of the output signal (voltage) from the illuminance of received-light X0 to illuminance of received-light X1 at which illuminance is maximum (target light radiation range) is expressed by the following expression (2).

$$Y=t2\cdot A\cdot X+t1\cdot A\cdot X \tag{2}$$

Here, reference sign t1 denotes the accumulation time, reference sign t2 is the readout time, and reference sign A a conversion coefficient.

Figure 7:
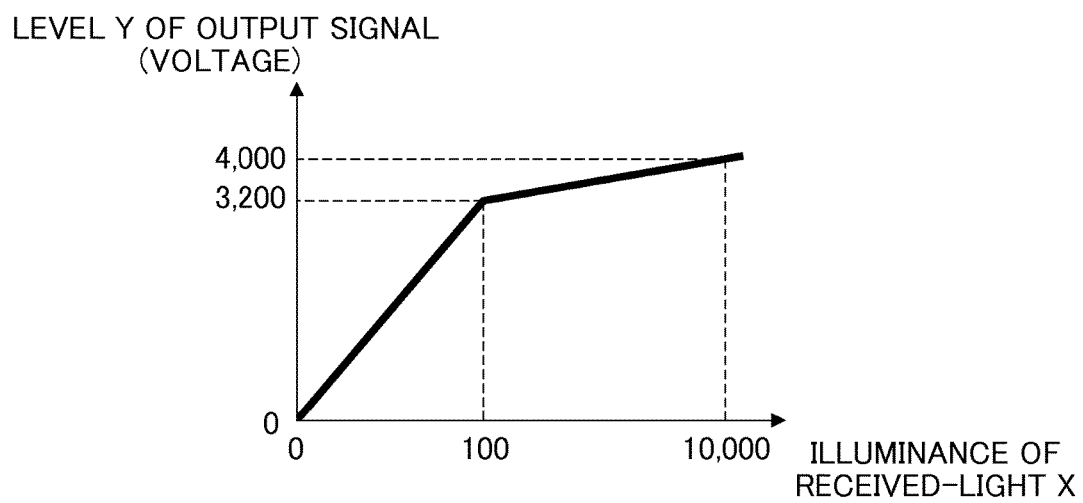
FIG. 7 is a graph which shows a setting example when using the relational model in FIG. 6.

FIG. 7 is a graph which shows a setting example when using the relational model in FIG. 6. As shown in FIG. 7, when the illuminance of received-light X0 is 100 1×, and the illuminance of received-light X1 is 10,000 1×, and by use of the above expressions (1), (2), the accumulation time t1 and the readout time t2 to satisfy a characteristic of an image sensor in which the level of output signal (voltage) is 12 bits≈4,000 digits, and 80% (=3.200 digits) of digital signals are allocated for the illuminance of received-light which is less than or equal to 100 1× are calculated, the following expressions (3), (4) are established from given conditions.

$$(R1)3{,}200=(t1+t2)\cdot A\cdot 100 \tag{3}$$

$$(R2)4{,}000=t2\cdot A\cdot 10{,}000+t1\cdot A\cdot 100 \tag{4}$$

When calculating the accumulation time t1 and the readout time t2 from the above expressions (3), (4), the accumulation time t1=31.9/A, and the readout time t2=0.08/A, and when trying to achieve this characteristic, it is obvious that a ratio of the accumulation time t1 to the readout time t2 needs to set to be 398.75:1≈399:1.

Next, a specific example of the above calculation will be considered. In an image sensor having output of 12 bits which operates at 30 fps in a full-HD (1080P) television system, a readout time of one pixel is approximately 30 µs at a maximum. For example, with respect to light with 100-lux illuminance of received-light, if parasitic capacitance is saturated for the accumulation time t1=5 ms, setting of the readout time t2 is 12 µs.

By performing this setting, until the 100-1× illuminance of received-light, a digital signal changes by 1 digit per 100-1×/3,200≈0.03-1× illuminance of received-light. And from 100-1× illuminance of received-light to 10,000-1× illuminance of received-light, the digital signal changes by 1 digit per (10,000−100)-1×/800≈12.4-1× illuminance of received-light. That is, an approximately 140-dB (0.03 1× to 10,000 1×) image sensor which has resolution of 0.03-1× illuminance of received-light and resolution of 12.4-1× illuminance of received-light is obtained. However, as a major premise, an image sensor needs to have an output characteristic (conversion coefficient A) which is processable in a circuit with respect to a change in an amount of light of each resolution. Since in the phototransistor Q1, the photocurrent is amplified and outputted, this is satisfied. However, a conventional image sensor having a photodiode as a light-receiving element does not have an amplifying function, and therefore, it is impossible to obtain sufficient output with respect to light exceeding the saturated exposure amount.

Those conditions (illuminance of received-light X0, illuminance of received-light X1, allocation of digital output bit signals, and the like) are greatly varied by multiple causes such as resolution of an image sensor, a frame rate, an output bit, requirement for application as a target, and the like. Therefore, it is necessary to perform an appropriate setting accordingly. Additionally, it is possible to expand a setting range by changing a drive condition such as reducing a frame rate, varying a lens aperture setting, or the like, as necessary.

Figure 8:
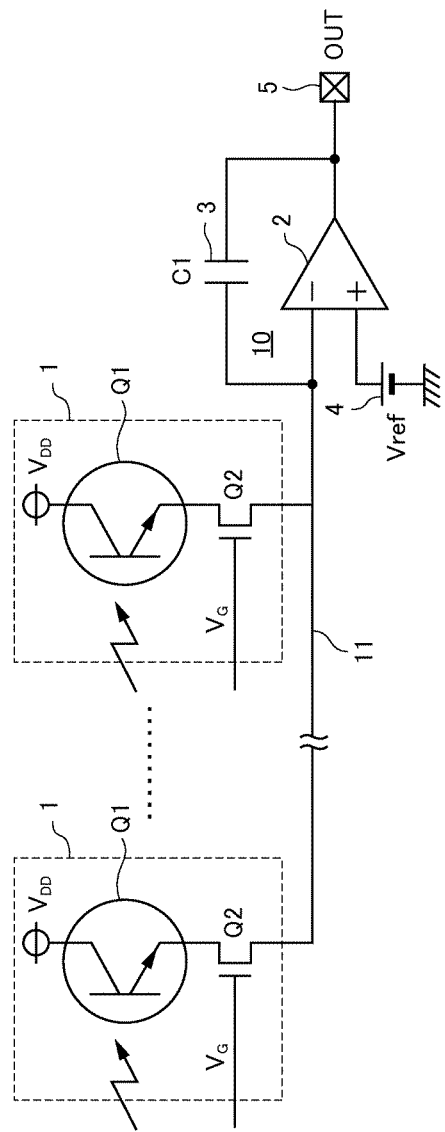
FIG. 8 is a circuit diagram which shows a configuration example of an image sensor circuit using the signal-processing circuit in FIG. 1.

FIG. 8 is a circuit diagram which shows a configuration example of an image sensor circuit using the signal-processing circuit in FIG. 1.

In FIG. 8, a one-dimensional image sensor is shown which includes a plurality of pixels 1 which are arranged linearly side by side, and an output terminal of each pixel 1 which is connected to a signal line 11, and takes out an output current to an integrating circuit 10 in a time-sharing manner from each pixel 1.

Please note that FIG. 8 shows the one-dimensional image sensor; however, a two-dimensional image sensor can be structured by juxtaposing a plurality of pixels 1 two-dimensionally. Additionally, an electronic device such as a digital camera system, a scanner device, a multifunctional peripheral, or the like can be structured by being equipped with a CDS circuit, an AGC circuit, an A/D convertor, a DSP signal-processing circuit, a video signal-encoding circuit, and the like as circuits which use output of the image sensor circuit in FIG. 8.

In the above embodiment, it is possible to set the accumulation time t1 and the readout time t2 in accordance with a desired resolution. Additionally, in accordance with a setting condition of the accumulation time t1 and the readout time t2, it is possible to change and set a drive condition such as a frame rate, a readout time, or the like which is set in the camera system, or the like. Accumulation time and readout time which are realistically settable are limited by, for example, the number of pixels and an operation speed, and therefore, for example, a setting in which the frame rate is reduced to half and a settable readout time is doubled, or the like can be performed.

Furthermore, in accordance with the setting condition of the accumulation time t1 and the readout time t2, a value of the parasitic capacitance of the phototransistor Q1 can be changed and set. For example, even when the parasitic capacitance of the phototransistor Q1 is reduced to half and photographing is performed under the same conditions, saturation occurs in half brightness.

SUMMARY OF THE EMBODIMENT

According to the embodiment of the present invention, it is characterized in that an imaging device includes a photoelectric conversion element which photoelectrically converts incident light and generates a charge, accumulates and amplifies the charge, and outputs a photocurrent, wherein a level of an output signal when a charge which is accumulated in the photoelectric conversion element is outputted over a saturated amount of accumulable charge includes a level of an output signal of a charge of a photocurrent of DC component which is generated in the photoelectric conversion element and outputted during a readout time when the charge which is accumulated in the photoelectric conversion element is outputted.

According to the embodiment of the present invention, it is characterized in that the photoelectric conversion element is a phototransistor.

According to the embodiment of the present invention, it is characterized in that an accumulation time and a readout time are set in accordance with a desired resolution.

According to the embodiment of the present invention, it is characterized in that a drive condition is changed and set in accordance with a setting condition of the accumulation time and the readout time.

According to the embodiment of the present invention, it is characterized in that parasitic capacitance of the photoelectric conversion element is changed and set in accordance with the setting condition of the accumulation time and the readout time.

According to the embodiment of the present invention, it is characterized in that the imaging device further includes an integrating circuit which integrates the photocurrent and outputs an output signal.

According to the embodiment of the present invention, it is characterized in that the imaging device is an image sensor.

According to the embodiment of the present invention, it is characterized in that an electronic device includes the imaging device.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging device comprising:
a photoelectric conversion element configured to include a phototransistor that photoelectrically converts incident light and generates a charge, accumulates and amplifies the charge, and to output a photocurrent,
wherein at a readout time, the phototransistor outputs an output signal including (i) a photocurrent of direct-current DC component generated in the phototransistor in response to illuminance of the incident light and (ii) an amount of accumulated charge which is accumulated in the phototransistor prior to the phototransistor exceeding a saturated amount of accumulable charge, and
wherein a level of the output signal when the accumulated charge which is accumulated in the phototransistor exceeds the saturated amount of accumulable charge reflects only the photocurrent of the direct-current (DC) component which is generated in the phototransistor in response to the illuminance of the incident light, and the readout time is set to be equal to or more than a time in which the accumulated charge which is accumulated in the phototransistor prior to the phototransistor exceeding the saturated amount of accumulable charge is output by the phototransistor, to expand a dynamic range of the imaging device.

2. The imaging device according to claim 1, wherein an accumulation time and the readout time are set in accordance with a desired resolution.

3. The imaging device according to claim 2, wherein a drive condition is changed and set in accordance with a setting condition of the accumulation time and the readout time.

4. The imaging device according to claim 2, wherein parasitic capacitance is changed and set in accordance with a setting condition of the accumulation time and the readout time.

5. The imaging device according to claim 1, further comprising an integrating circuit which integrates the photocurrent and outputs the output signal.

6. The imaging device according to claim 1, wherein the imaging device is an image sensor.

7. An electronic device comprising the imaging device according to claim 1.

8. The imaging device according to claim 1, wherein an accumulation time and the readout time are set in accordance with a desired resolution.

9. The imaging device according to claim 1, wherein an accumulation time and the readout time are set in accordance with a desired resolution, a drive condition is changed and set in accordance with a setting condition of the accumulation time and the readout time, and parasitic capacitance is changed and set in accordance with the setting condition of the accumulation time and the readout time.

10. The imaging device according to claim 8, wherein a drive condition is changed and set in accordance with a setting condition of the accumulation time and the readout time, and parasitic capacitance is changed and set in accordance with the setting condition of the accumulation time and the readout time.

11. The imaging device according to claim 1, further comprising an integrating circuit which integrates the photocurrent and outputs the output signal.

12. The imaging device according to claim 1, wherein an accumulation time and the readout time are set in accordance with a desired resolution, and the imaging device further comprises an integrating circuit which integrates the photocurrent and outputs the output signal.

13. The imaging device according to claim 8, further comprising an integrating circuit which integrates the photocurrent and outputs the output signal.

14. The imaging device according to claim 8, wherein parasitic capacitance is changed and set in accordance with a setting condition of the accumulation time and the readout time, and the imaging device further comprises an integrating circuit which integrates the photocurrent and outputs the output signal.

15. The imaging device according to claim 10, further comprising an integrating circuit which integrates the photocurrent and outputs the output signal.

* * * * *